United States Patent [19]

Elberbaum

[11] Patent Number: 4,945,417
[45] Date of Patent: Jul. 31, 1990

[54] METHOD AND APPARATUS FOR REMOTELY PRE-SETTING CLOSED CIRCUIT TELEVISION CAMERA

[75] Inventor: David Elberbaum, Tokyo, Japan
[73] Assignee: Elbex Video, Ltd, Tokyo, Japan
[21] Appl. No.: 271,200
[22] Filed: Nov. 14, 1988
[30] Foreign Application Priority Data Nov. 16, 1987 [JP] Japan .................................. 62-287549

[51] Int. Cl.$^5$ ................................................ H04N 5/30
[52] U.S. Cl. ..................................... 358/210; 358/108
[58] Field of Search ................... 358/108, 210, 87, 209, 358/125

[56] References Cited

U.S. PATENT DOCUMENTS

| | | | |
|---|---|---|---|
| 4,244,006 | 1/1981 | Kitahara et al. | 358/210 |
| 4,566,036 | 1/1986 | Kadosawa | 358/210 |
| 4,609,939 | 9/1986 | Kozawa et al. | 358/210 X |
| 4,805,218 | 2/1989 | Nishimura et al. | 358/125 X |

Primary Examiner—James J. Groody
Assistant Examiner—Victor R. Kostak
Attorney, Agent, or Firm—Helfgott & Karas

[57] ABSTRACT

In a closed circuit television apparatus, a television camera comprises an imaging device for generating video signals, a driver adapted to the imaging device to be rotated in order to change coordinates positions of the imaging device, a detector for detecting an angle of the coordinates positons of the imaging device as electrical signals, and a memory in which an information is stored and from which the information is read out. A controller is provided for receiving a command to store the control information for setting the imaging device in predetermined coordinates positions and a command to change the coordinates positions of the imaging device. The controller reads out from the memory the control information corresponding to the change command upon receipt thereof, and operates the driver until the output signals of the detector coincide with the read-out control information.

3 Claims, 1 Drawing Sheet

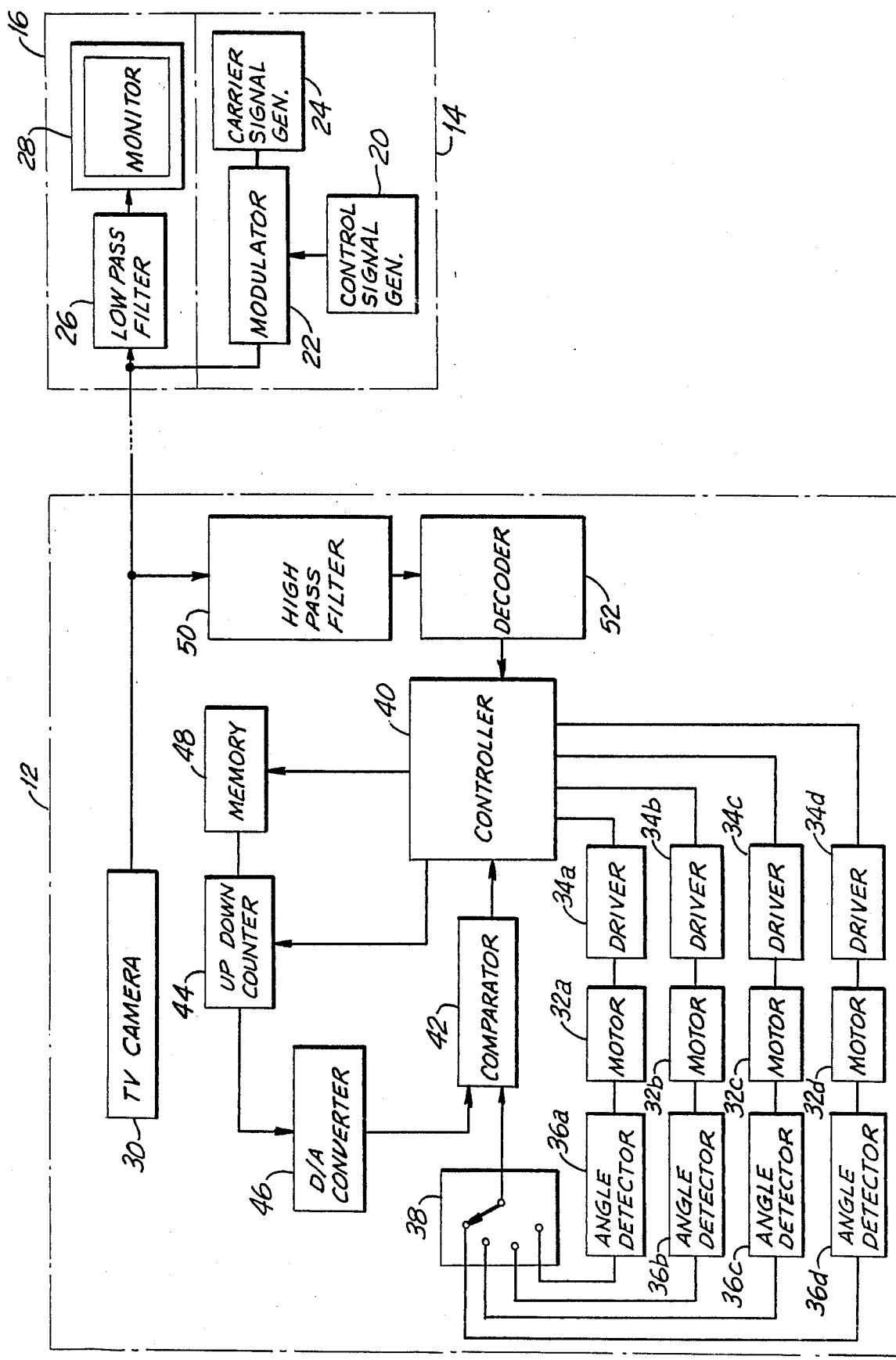

METHOD AND APPARATUS FOR REMOTELY PRE-SETTING CLOSED CIRCUIT TELEVISION CAMERA

BACKGROUND OF THE INVENTION

1. Field of the Invention:

This invention relates to a television camera suitable for a supervisory system, and also to a closed circuit television apparatus using such television camera. More particularly, the present invention relates to a television camera capable of multi presetting and positioning the television camera coordinates such as tilting, panning, focusing and zooming, and also to a closed circuit television apparatus using said camera.

2. Description of the Prior Art:

Generally, in a closed circuit television system such as a supervisory system, a remote-controllable television camera is located at each of a plurality of different places to be observed. At a central supervisory station, a monitor for receiving video signals from the selected television camera, a controlling device for controlling the coordinates of the television camera, such as up-down (tilting), left-right (panning), far-near (focusing) and wide-tele (zooming), and a switching circuit for selecting one of the television cameras to be connected to the controlling device and the monitor, are located.

The positioning of each television camera coordinates, such as tilting, panning, focusing and zooming, are controlled by control signals supplied from the controlling device, whereby the television camera is positioned to observe a specified object or scene and transmits to the central supervisory station video signals corresponding to the observation of the specified object or scene.

With this conventional apparatus, each coordinates of the television camera must be controlled and positioned independently every time the coordinates of the television camera are to be changed. Consequently, when resetting the television camera to observe a specified position, the positioning of the television camera coordinates, such a tilting, panning, focusing and zooming, must be changed individually, which is laborious.

SUMMARY OF THE INVENTION

It is therefore an object of the present invention to provide a television camera which can be preset to observe a multi predetermined specified object or scene with ease, and also to provide a closed circuit television apparatus using such television camera.

Another object of the present invention is to provide a closed circuit television apparatus with which it is not necessary to transmit the coordinates values to the television camera or from the television camera to a controlling device.

A television camera according to the present invention comprises an imaging means for generating video signals, a driving means adapted to the imaging means to be rotated in order to change coordinates positions of the imaging means, a detecting means for detecting the angle of the coordinates positions of the imaging means as electrical signals, a memory means in which information is stored and from which the information is read out, and a controlling means for receiving a command to store control information for setting the imaging means in a predetermined coordinates position and a command to change the coordinates position of the imaging means, for storing output signals of the detecting means as the control information in the memory means corresponding to the store command upon receipt thereof, for reading out from the memory means the control information corresponding to the change command upon receipt thereof, and for operating the driving means until the output signals of the detecting means coincide with the read-out control information.

A closed circuit television apparatus according to the present invention comprises a television camera for transmitting video signals, a monitoring device for receiving the video signals from the television camera and for displaying a picture corresponding to the video signals, a controlling device for generating a command to control the television camera, and the television camera including a imaging means for generating video signals, a driving means adapted to the imaging means to be rotated in order to change the coordinates positions of the imaging means, a detecting means for detecting the angle of the coordinates positions of the imaging means as electrical signals, a memory means in which information is stored and from which the information is read out, and a controlling means for receiving a command to store control information for setting the imaging means in a predetermined coordinates position, for storing output signals of the detecting means as the control information in the memory means corresponding to the store command upon receipt thereof, for reading out from the memory means the control information corresponding to the change command upon receipt thereof, and for operating the driving means until the output signals of the detecting means coincide with the read-out control information.

As the store command is given to the controlling means of the television camera, the detecting means output corresponding to the coordinates positions of the television camera, such as tilting, panning, focusing and zooming at that time, is memorized in the memory means as the control information in order to reproduce the same coordinates positions at another time.

On the other hand, as the change command is received to the controlling means of the television camera, the control information corresponding to the change command is read out from the memory means, whereupon the actual value of the coordinates of the television camera, such as tilting, panning, focusing and zooming, at the time of receiving the change command is compared to the read-out control information. As a result, the driving means are operated until the detecting means generate signal commensurate with the read out signal from the memory means corresponding to the change command.

With the television camera of the present invention, partly because the control information corresponding to the coordinates positions of the television camera when the store command is received is memorized in the memory means, and partly because the coordinates positions of the television camera are changed commensurate with the change command when the change command is received, it is possible to reproduce multi preset observation coordinates positions of the television camera with ease.

With the closed circuit television apparatus of the present invention, since the storing and reading of the control information take place at the television-camera side, it is not necessary to transmit the actual value of the coordinates of the television camera to the controlling device, or from the controlling device.

BRIEF DESCRIPTION OF THE DRAWINGS

The foregoing and other objects and features of the invention will become apparent from the following description of a preferred embodiment of the invention with reference to the accompanying drawing, in which:

FIG. 1 shows a block diagram showing an embodiment of a closed circuit television apparatus using a television camera according to the present invention.

DETAILED DESCRIPTION OF THE PREFERRED EMBODIMENT

The drawing shows a closed circuit television apparatus 10, in which a television camera 12 is located at each of a plurality of different places to be observed. The television camera 12 generates video signals corresponding to the observed object or scene and transmits the video signals to a central supervisory station. At the central supervisory station, an operating device or controlling device 14 for controlling the coordinates of the television camera 12, such as tilting, panning, focusing and zooming, and a monitoring device 16 for receiving the video signals transmitted from the television camera 12, are located. Between the central supervisory station and the respective place to be observed, a transmission line 18 such as a cable is built.

The transmitted video signal is a composite video signal which is composed by adding a composite synchronizing signal, etc. to an image signal.

The controlling device 14 includes a circuit 20 for generating various kinds of control signals for controlling the coordinates positions of the television camera 12. Various kinds of controls or commands are a command to change each coordinates position of the television camera 12 independently, a command to store control information for reproducing the coordinates positions of the television camera 12, and a command to change the coordinates positions to different coordinates positions corresponding to the stored or memorized control information. Further, a code is allotted to each of the commands.

The control signal generating circuit 20 includes a push-button-type telephone apparatus, or a tone encoder (put on the market under the name such as "dual tone encoder" and "touch tone encoder") used in the telephone apparatus.

The codes "11", "12", "13", "14", "15", "16", "17" and "18", for example, are allotted to a command to rotate, in one direction, a motor for adjustment of tilting, a command to reversely rotate the motor for adjustment of tilting, a command to rotate, in one direction, a motor for adjustment of panning, a command to reversely rotate the motor for adjustment of panning, a command to rotate, in one direction, a motor for adjustment of focusing, a command to reversely rotate the motor for adjustment of focusing, a command to rotate, in one direction, a motor for adjustment of zooming, and a command to reversely rotate the motor for adjustment of zooming, respectively. The code for each command may be one or more figures.

Other codes are allotted to the control information such as a store command code and a code to the command to change the coordinates positions to a different coordinates positions corresponding to the stored control information. The codes composed more than one figures allotted for each command includes an address code of one or more figures designating the address for the control information.

Each code is sent and received one figure after another by depressing the buttons of the push-button-type telephone apparatus or the tone encoder. Thus, if the code is one figure, a composite signal of two signals of different frequencies determined according to the code is outputted from the control signal generating circuit 20 as a control signal. On the other hand, if the code is more than one figure, the composite signal for each figure of the code is generated from the control signal generating circuit 20 as a control signal. This composite signal is composed of one of four signals having different frequencies f1, f2, f3, f4 and one of other four signals having different frequencies f5, f6, f7, f8.

The control signal generating circuit 20 may have a plurality of switches as substitute for the push-button-type switches of the tone encoder, also in this case the control signal is a composite signal of two different kinds of signals corresponding to the number of the codes.

The control signal generating circuit 20 may be constructed of a setting circuit for setting the command code and the address code, and a processing circuit for generating control signals each having a frequency corresponding to the code set in the setting circuit as substitute for the telephone apparatus or tone encoder. The setting circuit may include a key-pad, a plurality of switches, a joy stick, or the like. Otherwise the setting circuit may be a remote-controlling device of radio system, an IR system or the like. The processing circuit may be a dial tone encoder or a computer serial coder.

Alternatively, the control signal may be a single kind of signal or a composite signal of more than two signals having frequencies different from each other according to the code.

The control signals generated from the control signal generating circuit 20 are supplied to a modulating circuit 22. The modulating circuit 22 modulates each frequency of carrier signals, generated from a carrier signal generating circuit 24, by the control signals. The carrier signal generated from the carrier signal generating circuit 24 has a constant frequency adequately higher than the maximum frequency of the video signals transmitted from the television camera 12 to the monitoring device 16.

The modulated carrier signals are transmitted from a circuit portion between the television camera 12 and the monitoring device 16 to the television camera 12. The frequency range of the modulated carrier signal is higher than the maximum frequency of the video signals transmitted from the television camera 12 to the monitoring device 16.

A signal to be transmitted from the controlling device 14 to the television camera 12 may be the control signal itself, if the frequency of each control signal is higher than that of the video signals.

The monitoring device 16 includes a low-pass filter 26 which allows the video signals to pass and prevents the modulated carrier signals from passing, and a monitor or television receiver 28 connected to the output terminal of the low-pass filter. The picture reproduced on the television receiver 28 is not affected by the modulated carrier signals, because the modulated carrier signals are eliminated from the input signals of the monitoring device 16 by the filter 26.

The television camera 12 includes a camera body 30 such as an image processing device. The camera body 30 generates video signals through the transmission line 18. The tilt positioning, the pan positioning, the focus positioning and the zoom positioning of the camera body 30 are positioned by motors 32a, 32b, 32c, 32d, respectively. These motors are driven by their corresponding drivers 34a, 34b, 34c, 34d.

Angle detectors 36a, 36b, 36c, 36d are connected to the shaft of the mechanical assemblies of the corresponding motor 32a, 32b, 32c, 32d independently. Each angle detector generates to an electronic switch 38 such as a multiplexer, voltage commensurate with the angle of rotation of the shaft of the mechanical assemblies of the corresponding motor. Alternatively, the mechanical switch may be used.

The electronic switch 38 includes a plurality of impute poles connected to the respective output terminals of the corresponding angle detectors 36a, 36b, 36c, 36d. The common pole of the switch 38 is controlled by the controller 40 to scan in synchronized sequence all the impute poles of the switch 38. The controller 40 controls the drivers 34a, 34b, 34c, 34d commensurate with the control signals, therefor synchronizes the scanning of the impute poles of the switch 38 to coincide the scanning of the respective detector output with the control signal to the corresponding driver of the motor to be controlled. The common pole of the switch 38 is connected to one of input terminals of a comparator 42.

To the other input terminal of the comparator 42 is connected to the output terminal of a digital-analogue converter 46. A counted value of a counter 44 is converted into an analoguous value by the digital-analogue converter 46 which is connected to the output of the counter 44. The comparator 42 generates coincidence signals when the two input signals coincide with each other. The counter 44 is an up-down counter of preset type which is controlled by the controller 40.

The television camera 12 also includes a memory 48 in which control information is stored and from which the control information is read out. The storing and reading of the control information are controlled by the controller 40.

The modulated carrier signals transmitted from the controlling device 14 to the television camera 12 are extracted by a high-pass filter 50, which allows the carrier signals to pass and are then generated to a decoder 52 connected to the output side of the filter 50.

The decoder 52 generates to the controller 40 signals corresponding to the command transmitted from the controlling device 14 as the control signals are demodulated from the modulated carrier signals by a demodualting circuit (not shown) and then the demodulated control signals are decoded by a known circuit (not shown) such as a touch tone decoder.

In operation, when for changing any of the coordinates position such as tilting, panning, focusing and zooming of the television camera body 30, control signals corresponding to the command to rotate one of the motors 32a, 32b, 32c, 32d in one direction or reversely are transmitted from the controlling device 14 to the television camera 12, signals corresponding to the command are transmitted from the decoder 52 to the controller 40.

Based on the signals transmitted from the decoder 52, the controller 40 activates any one of the drivers 34a, 34b, 34c or 34d. Since one of the motors corresponding to the command is thereby rotated, any of the functions, i.e., tilting, panning, focusing and zooming, of the camera body 30 is corrected so that the coordinates positions of the television camera 12 are changed to the new positions instructed by the controlling device 14.

When commanding to change a single coordinate of the television camera, the attendant can control the television camera 12 while observing the picture on the television receiver 28, so that the optimum picture is displayed on the television receiver 28.

On the other hand, when control signals corresponding to the command to store control information are transmitted from the controlling device 14 to the television camera 12, signals corresponding to the store command and the address are transmitted from the decoder 52 to the controller 40.

The controller 40 generates the control signals to the switch 38 to scan in synchronized sequence the impute poles of the switch 38, thereby for every angle detector output, namely, for each coordinates position of tilting, panning, focusing and zooming, connects the impute poles of the switch 38 to the comparator 42, thereby connects in synchronized sequence all of the angle detectors to the comparator 42, enable the counter 44 to continue counting up or down until coincidence signals are supplied in the synchronized sequence from the comparator 42, and stores a value of the output of the counter 44 in a memory 48 in the synchronized sequence when the coincidence signals are supplied.

As a result, actual values of tilting, panning, focusing and zooming are memorized in the memory means. If the control information is already memorized at the memory portion designated by the address code, the control information of that memory portion is renewed to a new actual value. This memorized actual value is used as control information to reproduce the preset coordinates position of the television camera which position corresponds to the actual value.

The command to store the control information is transmitted by the operator after the coordinates positions of the television camera are changed individually until the optimum observation picture is displayed on the television receiver 28. Thus, it is possible to memorize the control information corresponding to the optimum observation position of the television camera.

For storing a plurality of kinds of control information, series commands, in which the address codes are allotted, are transmitted to the television camera 12.

As control signals corresponding to the command to change the coordinates positions of the television camera 12 are transmitted from the controlling device 14 to the television camera 12, signals corresponding to the change command and the address are transmitted from the decoder 52 to the controller 40.

Thus, the controller 40, for each and all coordinates positions of the television camera, i.e., tilting, panning, focusing and zooming, generates a signal to the switch 38 to scan in synchronized sequence the switch 38 and thereby connect the output of all of the angle detectors in synchronized sequence to the comparator 42, reads out in synchronized sequence the information corresponding to each and all of the coordinates positions in the memory 48, presets the read-out information in the counter 44, and controls each and all of the drivers to rotate the corresponding motor until coincidence signals are supplied in synchronized sequence from the comparator 42. As a result, the camera body 30 is changed to the predetermined preset coordinates positions according to the change command.

What is claimed is:
1. A television camera comprising:
  imaging means for generating video signals;

driving means adapted to the imaging means to be rotated in order to change coordinates positions of said imaging means;

detecting means for detecting the angle of the coordinates positions of said imaging means as electrical signals;

memory means in which information is stored and from which the information is read out; and controlling means for receiving a command to store control information for setting said imaging means in a predetermined coordinates position and a command to change the coordinates position of said imaging means, for storing output signals of said detecting means as the control information in said memory means corresponding to the store command upon receipt thereof, for reading out from said memory means the control information corresponding to the change command upon receipt thereof, and for operating said driving means until the output signals of said detecting means coincide with the read-out control information, said controlling means including a counter in which the control information memorized in said memory means may be preset, a digital-to-analog converter for converting a counted value of said counter into an analog value, means for comparing output signals of said converter with the output signals of said detecting means and for generating coincidence signals when said output signals of said converter and said detecting means coincide with each other, and a controller for receiving the store command, the change command and the coincidence signals, for enabling said counter, upon receipt of the store command, to continue counting until the coincidence signals are generated, for storing the counted value of said counter, as the coincidence signals are generated, in said memory means at a portion thereof corresponding to the store command, for reading out from said memory means, upon receipt of the change command, the control information corresponding to the change command, for presetting the read-out control information in said counter, and for operating said driving means until the coincidence signals are generated.

2. A television camera according to claim 1, wherein said driving means includes a reversely rotatable motor, and said detecting means includes an angle detector for detecting an amount of rotation of said motor.

3. A closed circuit television apparatus comprising:
a television camera for transmitting video signals;
a monitoring device for receiving the video signals from said television camera and for displaying a picture corresponding to the video signals;
a controlling device for generating a command to control said television camera;
said television camera including:
imaging means for generating video signals;
driving means adapted to the imaging means to be rotated in order to change the coordinates positions of said imaging means;
detecting means for detecting the angle of the coordinates positions of said imaging means as electrical signals;
memory means in which information is stored and from which the information is read out, and
controlling means for receiving a command to store control information for setting said imaging means in a predetermined coordinates position, for storing output signals of said detecting means as the control information in said memory means corresponding to the store command upon receipt thereof, for reading out from said memory means the control information corresponding to the change command upon receipt thereof, and for operating said driving means until the output signals of said detecting means coincide with the read-out control information,
said controlling device including a circuit for generating control signals each having a frequency corresponding to the kind of control, a circuit for generating carrier signals each having a frequency higher than the frequency of each video signal, and a modulating circuit for modulating the carrier signals by the control signals, and said controlling means including a filter for receiving the modulated carrier signals generated in said controlling device, and for extracting the carrier signals, a decoder for demodulating the control signals from the extracted carrier signals and for generating signals corresponding to the demodulated signals, and a controller for storing, when the signals corresponding to the store command are received from said decoder, the output signals of said detecting means as the control information in said memory means, for reading out from said memory means, when the signals corresponding to the change command are received from said decoder, the control information corresponding to the change command, and for operating said driving means until the output signals of said detecting means coincide with the readout control information.

* * * * *